(12) United States Patent
 Sibiryakov

(10) Patent No.: US 8,478,051 B2
(45) Date of Patent: Jul. 2, 2013

(54) GENERALIZED STATISTICAL TEMPLATE MATCHING UNDER GEOMETRIC TRANSFORMATIONS

(75) Inventor: Alexander Sibiryakov, Guildford (GB)

(73) Assignee: Mitsubishi Electric Corporation, Tokyo (JP)

( * ) Notice: Subject to any disclaimer, the term of this patent is extended or adjusted under 35 U.S.C. 154(b) by 812 days.

(21) Appl. No.: 12/595,456

(22) PCT Filed: Mar. 20, 2008

(86) PCT No.: PCT/GB2008/001006

§ 371 (c)(1),
(2), (4) Date: Dec. 1, 2009

(87) PCT Pub. No.: WO2008/125799

PCT Pub. Date: Oct. 23, 2008

(65) Prior Publication Data

US 2010/0119160 A1    May 13, 2010

(30) Foreign Application Priority Data

Apr. 13, 2007 (GB) .................................. 0707192.1

(51) Int. Cl.
*G06K 9/62* (2006.01)

(52) U.S. Cl.
USPC ......................................................... 382/209

(58) Field of Classification Search
None
See application file for complete search history.

(56) References Cited

U.S. PATENT DOCUMENTS

| 6,249,608 | B1 * | 6/2001 | Ikeda et al. | ................... 382/209 |
| 6,330,353 | B1 | 12/2001 | Lai et al. | |
| 6,546,137 | B1 | 4/2003 | Lai et al. | |
| 2004/0081360 | A1 | 4/2004 | Lee et al. | |
| 2006/0029291 | A1 | 2/2006 | Sun et al. | |
| 2006/0088189 | A1 * | 4/2006 | Szeliski et al. | ................ 382/103 |

FOREIGN PATENT DOCUMENTS

EP    1 693 783 A    8/2006

* cited by examiner

*Primary Examiner* — Brian P Werner
(74) *Attorney, Agent, or Firm* — Birch, Stewart, Kolasch & Birch, LLP

(57) ABSTRACT

A method of detecting a geometrically transformed object in an image comprises comparing a template comprising a plurality of line segments for the object with regions of an image, and determining a similarity measure that uses a statistical measure based on the sums of pixel values of line segments of the image corresponding to each of the line segments of the template. Embodiments of the invention use a discrete set of geometrically transformed versions of the template, for example using the similarity transform.

24 Claims, 4 Drawing Sheets

(a) Image (b) Template (c) Result (a) Transformed image     (b) Template     (c) Result (d) ASSTM iterations

GENERALIZED STATISTICAL TEMPLATE MATCHING UNDER GEOMETRIC TRANSFORMATIONS

BACKGROUND OF THE INVENTION

1. Field of the Invention

The present invention relates to a method and apparatus for detecting or locating an object in an image. In particular, the present invention relates to a method and apparatus for matching a template to an image, to locate an object corresponding to the template, when the object has been subject to a geometric transformation. The present invention further relates to a method for determining a geometric transformation of an object in an image.

2. Description of the Background Art

Template matching (TM) is a standard computer vision tool for finding objects or object parts in images. It is used in many applications including remote sensing, medical imaging, and automatic inspection in industry. The detection of real-world objects is a challenging problem due to the presence of illumination and colour changes, partial occlusions, noise and clutter in the background, and dynamic changes in the object itself.

A variety of template matching algorithms have been proposed. For example, P. Viola, M. Jones, "Rapid object detection using a boosted cascade of simple features" IEEE CVPR, pp. 511-518, 2001 (reference 1, infra) and EP-A-1 693 783 (reference 2, infra) describe extremely fast computing based on simple rectangular features. Other examples, such as Jain, Y. Zhong, S. Lakshmanan, "Object Matching Using Deformable Templates", IEEE TPAMI, Vol. 18(3), pp 267-278, 1996 (reference 3, infra) and S. Yoshimura, T. Kanade, "Fast template matching based on the normalized correlation by using multiresolution eigenimages", IEEE/RSJ/GI Int. Conf. on Intelligent Robots and Systems (IROS'94), Vol. 3, pp. 2086-2093, 1994 (reference 4, infra) describe fitting rigidly or non-rigidly deformed templates to image data.

The general strategy of template matching is the following: for every possible location, rotation, scale, or other geometric transformation, compare each image region to a template and select the best matching scores. This computationally expensive approach requires $O(N_l N_g N_t)$ operations, where $N_l$ is the number of locations in the image, $N_g$ is the number of transformation samples, and $N_t$ is the number of pixels used in matching score computation. Many methods try to reduce the computational complexity. $N_l$ and $N_g$ are usually reduced by the multiresolution approach (e.g., such as in reference 4, infra). Often the geometric transformations are not included in the matching strategy at all, assuming that the template and the image patch differ by translation only (such as in reference 11, infra).

Another way to perform template matching is direct fitting of the template using gradient descent or gradient ascent optimization methods to iteratively adjust the geometric transformation until the best match is found. Such a technique is described in Lucas, T. Kanade, "An iterative image registration technique with an application to stereo vision" Proc. of Imaging understanding workshop, pp 121-130, 1981 (reference 10, infra). These techniques need initial approximations that are close to the right solution.

In rapid template matching methods (such as those described in references 1, 2, 5, 6, 7, infra) the term $N_t$ in the computational complexity defined above is reduced by template simplification, e.g., by representing the template as a combination of rectangles. Using special image preprocessing techniques, so-called integral images, and computing a simplified similarity score, the normalized contrast between "positive" and "negative" image regions defined by the template, the computational speed of rapid template matching is independent of the template size and depends only on the template complexity (the number of rectangles comprising the template). However, Haar-like features are not rotation-invariant, and a few extensions of this framework have been proposed to handle the image rotation. For example M. Jones, P. Viola, "Fast Multi-view Face Detection", IEEE CVPR, June 2003 (reference 5, iqfra), proposed additional set diagonal rectangular templates. R. Lienhart, J. Maydt. "An extended set of Haar-like features for rapid object detection", ICIP'02, pp. 900-903, V.1, 2002 (reference 6, infra), proposed 45° twisted Haar-like features computed via 45° rotated integral images. Messom, C. H. and Barczak, A. L, "Fast and Efficient Rotated Haar-like Features using Rotated Integral Images", Australasian Conf. on Robotics and Automation, 2006 (reference 7, infra) further extended this idea and used multiple sets of Haar-like features and integral images rotated by whole integer-pixel based rotations.

The rapid template matching framework, described above, has a few implicit drawbacks, which are not presented in computationally expensive correlation-based TM methods A first drawback is that it is not easy to generalize two-region Haar-like features to the case of three or more pixel groups. In addition, rectangle-based representation is redundant for curvilinear object shapes, e.g. circles. Usage of curved templates instead of the rectangular ones should result in such cases in higher matching scores and, therefore, in better detector performance.

Moreover, whilst impressive results with Haar-like features may be achieved by using powerful classifiers based on boosting (as in reference 1, infra), such techniques require training on large databases. Therefore, matching using a single object template (achievable at no additional cost in correlation-based template matching using a grayscale template) cannot be easily performed in this framework, or it can be performed only for objects having simple shape and bimodal intensity distribution.

The present application proposes a new approach that can be placed in between rapid template matching methods and standard correlation-based template matching methods in terms of computational complexity and this matching speed. The proposed approach addresses some of the limitations of existing techniques described above and, optionally, can also be extended to an iterative refinement framework for precise estimation of object location and transformation.

SUMMARY OF THE INVENTION

A new template matching framework is proposed, in which a template is a simplified representation of the object of interest by a set of pixel groups of any shape, and the similarity between the template and an image region is derived from the so-called F-test statistic.

In order to match a geometrically transformed object, in one embodiment, a set of geometrically transformed versions of the template (e.g. resulting from rotation and scaling using a predetermined discrete set of parameters) is applied at each location in the image, and the geometric parameters of the geometrically transformed template giving the best matching score are associated with the corresponding location.

In accordance with an embodiment of the present invention, efficient matching is achieved using 1D analogue of integral, images, referred to herein as "integral lines". In this way, the number of operations required to compute the matching score is linear with template size. This compares to a quadratic dependency in conventional template matching. Although this 1D integral lines technique may viewed be as a particular case of 2D integral images, the inventors have unexpectedly realised that the area of applicability of template matching is much wider when using integral lines, than when using integral images. In particular, whilst the integral images technique requires an object shape formed from a combination of rectangles, the integral lines method of the present invention requires just a combination of line segments. A combination of line segments is a more general case, because any rasterized 2D shape can be represented as a combination of line segments.

In an embodiment, the template and each geometrically transformed version of the template is rasterized into sets of line segments, where each set of segments is the rasterized version of one region of the template. One or more complex regions, having the largest number of segments, are excluded from computations using a similarity score, such as the similarity score defined by equation (9), below. For a rotationally-symmetrical template (when its outer region is circle), the similarity score may be further simplified by storing intermediate terms, computed for the outer region.

In one embodiment, a discrete set of geometrically transformed versions of the template, corresponding to predetermined scale and rotation parameters only, are used in calculating the similarity score. Although the assumption that the geometric deformations are small enough to be approximated by scale and rotation is restrictive, an adaptive subpixel refinement method may be used to enhance the accuracy of matching of an object under arbitrary parametric 2D-transformations. The parameters maximizing the matching score may be found by a so-called "gradient ascent/descent method". In one embodiment, this can be reduced to solving an equivalent eigenvalue problem.

Further preferred and optional features of the present invention will be apparent from the following description and accompanying claims. Embodiments of the present invention will now be described, by way of example, with reference to the accompanying drawings.

BRIEF DESCRIPTION OF THE DRAWINGS

FIG. 2(a) shows a template consisting of three regions of circular shape; FIG. 2(b) shows a $1^{st}$ region of interest ($R_1$) in an image; FIG. 2(c) shows a $2^{nd}$ region in the image ($R_2$); FIG. 2(d) show the decomposition of $R_1$ into three regions by the template where the pixel groups are similar; FIG. 2(e) decomposition of the $R_2$ where the pixel groups are different;

DETAILED DESCRIPTION OF THE EMBODIMENTS

In the following description, template matching is described, which involves the processing of signals corresponding to images and templates of objects to be detected in images. The processing can be performed by any suitable system or apparatus, and can be implemented in the form of software. The template matching process produces a "matching score", also called a "similarity score," for locations of the template in an image.

A method according to the present invention is based on so-called Statistical Template Matching (STM), first introduced in EP-A-1 693 783 (reference 2, infra), the contents of which are hereby incorporated by reference. The framework of Statistical Template Matching is very similar to the rapid template matching framework discussed above; the main difference is that Statistical Template Matching uses a different matching score derived from the F-test statistic, thereby supporting multiple pixel groups. The Statistical Template Matching method is overviewed below.

In the following description, a method using generalised Statistical Template Matching according to embodiments of the present invention is described. Thereafter, particular embodiments for use in implementing the method will be described in detail. A first embodiment of the present invention concerns a new extension of Statistical Template Matching for matching rotated and scaled objects. The extension is based on using "integral lines", as described in more detail below. Moreover, a second embodiment concerns another new extension, termed "Adaptive Subpixel (AS) STM", suitable for accurate estimation of parametric 2D-transformation of the object. A third embodiment concerns an efficient solution for a particular case of Haar-like templates.

Overview of the Prior Art Statistical Template Matching Approach

Figure 2:
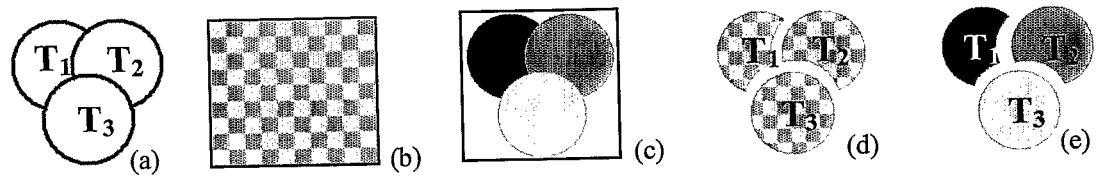

The name Statistical Template Matching originates from the fact that only statistical characteristics of pixel groups, such as mean and variance, are used in the analysis. These pixel groups are determined by a topological template, which is the analogue of the Haar-like feature in a two-group case. The topological template is a set of N regions $T_0 = T_1 U \ldots UT_N$, representing spatial relation of object parts. Each region $T_i$ may consist of disconnected sub-regions of arbitrary shape. If image pixel groups, defined by template regions, statistically differ from each other, it is likely that these pixel groups belong to the object of interest. This principle can be demonstrated by a simplified example shown in FIG. 2. FIG. 2(a) shows a template consisting of three regions of circular shape, $T_1$ $T_2$ and $T_3$. FIGS. 2(b) and 2(c) show first and second regions of interest $R_1$ and $R_2$, respectively. The template $T_o = T_1 UT_2 UT_3$ is matched to image regions $R_1$ and $R_2$. In the first case, when matching template $T_0$ with image region $R_1$, as shown in FIG. 2(d), three pixel groups are similar, as they have roughly the same mean value. In the second case when matching template $T_0$ with image region $R_2$, as shown in FIG. 2(e), the pixel groups are different (black, dark-gray and light-gray mean colours), from which it is possible to conclude that image region $R_2$ is similar to the template.

Formally, such a similarity (the matching score) between the template $T_0$ and an image region $R(x)$, centred at some pixel $x = (x,y)$, is derived from the so-called F-test statistic. Denote the number of pixels, mean and variance of pixel values in the region $T_i$, (i=0, as $n_i$, $m_i$ and $\sigma_i^2$ respectively.

Assuming normal distribution of pixel values and equal variances, and using the standard Analysis Of Variances (ANOVA) technique, the Between-group variation $V_{BG}$ and Within-group variation $V_{WG}$ are defined:

$$V_{BG}(T_1, \ldots, T_N) = -n_0 m_0^2 + \sum_{i=1}^{N} n_i m_i^2, \quad (1)$$

$$V_{WG}(T_1, \ldots, T_N) = \sum_{i=1}^{N} n_i \sigma_i^2,$$

Taking into account degrees of freedom of $V_{BG}$ and $V_{WG}$, the relationship $V_{BG}+V_{WG}=n_0\sigma_0^2$ and applying equivalent transformations, the F-variable becomes:

$$F = \frac{V_{BG}}{V_{WG}} \frac{n_0 - N}{N-1} = \left( \frac{n_0 \sigma_0^2}{n_1 \sigma_1^2 + \ldots + n_N \sigma_N^2} - 1 \right) \frac{n_0 - N}{N-1}. \quad (2)$$

Removing constant terms in equation (2), the expression for the matching score (or similarity score) is obtained as:

$$S(x) = \frac{n_0 \sigma_0^2}{n_1 \sigma_1^2 + \ldots + n_N \sigma_N^2}. \quad (3)$$

Computed for all pixels x, the matching scores derived using equation (3) form a confidence map, in which the local maxima correspond to likely object locations. Application-dependent analysis of statistics $m_i$, $\sigma_i$ helps to reduce the number of false alarms. When photometric properties of the object parts are given in advance, e.g., some of the regions are darker or less textured than the others, additional constraints, such as relation (4), reject false local maxima:

$$m_i < m_j, \sigma_i < \sigma_j \quad (4)$$

For Haar-like features (N=2), the matching score in equation (3) can also be derived from the squared t-test statistic, which is the squared signal-to-noise ratio (SNR), ranging from 1 (noise), corresponding to the case when all groups are similar, to infinity (pure signal), corresponding to the case when the template strictly determines the layout of pixel groups and all pixels in a group are equal. The distribution of pixel values in image patches can be arbitrary and usually does not satisfy the above assumptions (normal distribution, equal variances); therefore, in practice, it is convenient to interpret the matching score in equation (3) as SNR. Instead of using statistical tables for the F-variable, a reasonable SNR threshold above 1 can determine if the similarity in equation (3) between the template and the image region is large enough.

The real-time implementation of STM, according to EP-A-1 693 783 (reference 2, infra), uses templates with regions $T_i$ consisting of the union of rectangles. From the following description, it will be appreciated that using the integral images, in accordance with the present invention, the pixel variances from equation (3) are computed using only $8k_1$ memory references, where $k_i$ is a number of rectangles in $T_i$.

Method using Generalised STM

Figure 1:
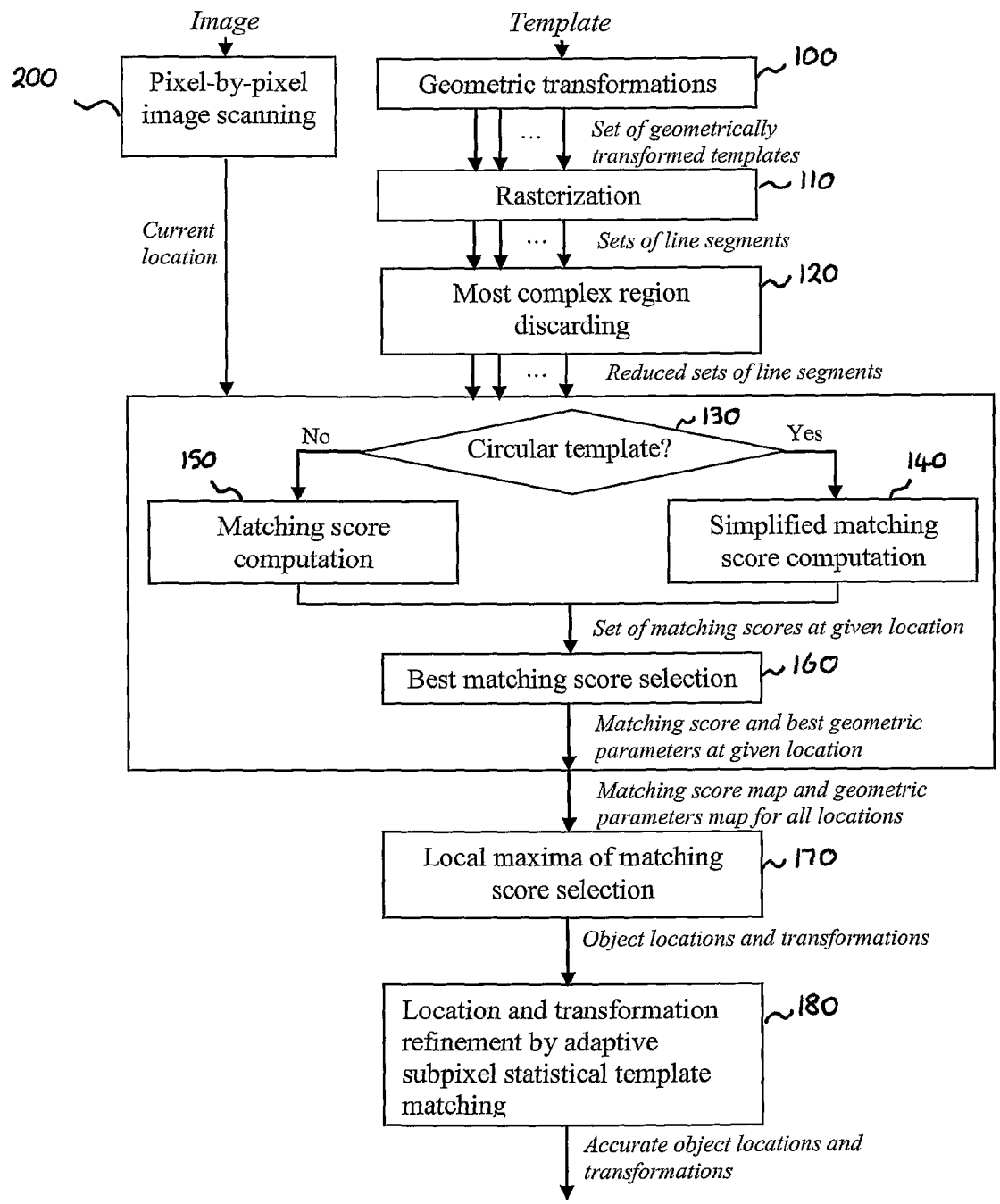
FIG. 1. is a flow diagram illustrating the steps of a method according to an embodiment of the present invention.

FIG. 1 shows a method of Statistical Template Matching, which generalises the above described principles, according to an embodiment of the present invention. A template for an object of interest is received at step 100 and a predetermined set of geometric transforms are applied to derive a set of geometrically transformed templates. At step 110, each of the geometrically transformed templates is rasterised to produce a set of line segments for each geometrically transformed template, each region of the template comprising a subset of the line segments. At step 120, optionally, one or more most complex region of the rasterised template (e.g. corresponding to a region with a largest or threshold number of line segments) is discarded to obtain a reduced set of line segments for each of the geometrically transformed templates, which are then used for statistical template matching.

A test image is scanned pixel by pixel in step 200, and template matching performed at the current location of the image as follows. Step 130 determines whether the template is a circular template. If the template is circular, template matching is performed using a simplified matching score computation, which does not take into account rotation of the entire template. Alternatively, if the template is not circular, template matching is performed using a standard matching score computation, as described below.

If the template is circular, a simplified matching score computation is performed in step 140 at the current location of the test image, to produce a set of matching scores for the templates (i.e. a matching score for each geometrically transformed version of the template) at the current location of the image. If the template is not circular, a standard matching score computation is performed at step 150 at the current location of the test image, to produce a set of matching scores at the current location of the image.

Step 160 receives the set of matching scores from either step 140 step 150, and selects the best matching score (e.g. a maximum score), and outputs the best geometric parameters, corresponding to the geometric transformation of the template with the best matching score, for the current location of the image.

Statistical template matching is then performed, in accordance with steps 140 to 160 as described above, for all image locations, and a matching score map and geometric parameters map for all the locations of the image is output to step 170.

At step 170, local maxima of matching score are selected, and object locations and transformations corresponding to the maxima are output. Optionally, at step 180, location and transformational refinement is performed by adaptive subpixel statistical template matching, in accordance with an alternative embodiment of the present invention. Step 180 enables accurate object locations and transformations to be obtained, in the case of more complex geometric transformations, as will be appreciated from the following description.

As the skilled person will appreciate, the method of the embodiment of the present invention as illustrated in FIG. 1, may be performed by any suitable apparatus including a processor, for processing signals corresponding to images, and memory for storing data for images and templates. The method may be implemented in the form of a computer program stored on a computer readable medium, having instructions, executable by a processor.

Techniques for performing matching score computation, as in step 150, and simplified matching score computation, as in step 140 will be described below. In addition, the adaptive subpixel statistical template matching technique of the alternative embodiment will be described, thereafter.

Generalized STM Under Geometric Transformations

Figure 3:
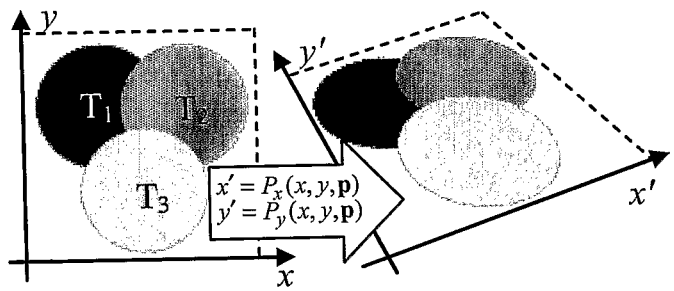
FIG. 3 illustrates object transformation in a perspective model.

In generalized STM (GSTM), according to the present invention, an object of interest is considered that is transformed by a transformation P with unknown parameters $p=(p_1, \ldots, p_k)^T$. This is schematically shown in FIG. 3. In order to match the object accurately, the template should be transformed using the same model P. As the parameters are unknown, all combinations $(p_1^{(j_1)}, \ldots p_k^{(j_k)})$ of their discrete values $p_i^{(j)} = p_{i\,min} + j\Delta p_i$ are used to transform the template and compute the best matching score:

$$S(x) = \max_{p_1, \ldots, p_k} S(x; p_1, \ldots, p_k) \quad (5)$$

By storing the indexes of the best parameter combination $$(j_1, \ldots, j_k)^* = \underset{j_1, \ldots, j_k}{\mathrm{argmax}}\, S(x; p_1^{(j_1)}, \ldots, p_k^{(j_k)}), \quad (6)$$

it is possible to recover an approximated object pose. The number of parameter combinations and computational time grow exponentially with the number of parameters; therefore, it is essential to use a minimal number of parameters. Many approaches, such as those in references 4-7, infra, use the fact that moderate affine and perspective distortions are approximated well by the similarity transform requiring only two additional parameters for rotation and scale. In a method according to an embodiment of the present invention, as shown in FIG. 1, a predetermined set of similarity transforms is applied to the template at step 100, and, for each location, the templates and corresponding rotation and scale parameters are selected that give the best matching score using equations (5)-(6), above.

It will be appreciated that this technique is based on the assumption that the geometric deformations are small enough to be approximated by a similarity transform. In some cases, however, this assumption is restrictive. Accordingly, in an alternative embodiment described below, an iterative technique is used for recovering a full parametric 2D-transformation, which uses the similarity transform of the first embodiment as an initial approximation.

Figure 4:
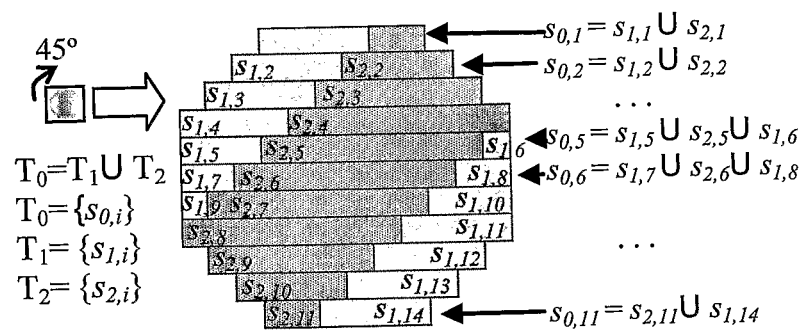
FIG. 4 illustrates rotation of a two region template by 45°, and its representation by a set of lines, in accordance with the present invention.

In accordance with the present embodiment, and referring again to FIG. 1, each transformed template is rasterized at step 110, and each template region is represented by a set of line segments $\{s_{i,j}|s_{i,j}=(x_1,x_2,y)_{i,j}\}$ as shown in FIG. 4:

$$T_i = s_{i,1} \cup s_{i,2} \cup s_{i,3} \cup \ldots$$

As shown in FIG. 4, each line segment is a rectangle of one-pixel height, and thus, the integral images technique can be used to compute the variances, as in equation (3), using Statistical Template Matching. However, in accordance with the present embodiment, a more optimal way of computation that handles segments efficiently involves the use of a one-dimensional analogue of integral images, integral lines, defined as follows:

$$I_1(x, y) = \sum_{a \leq x} f(a, y); \; I_2(x, y) = \sum_{a \leq x} f^2(a, y) \quad (7)$$

A similar definition can be given for integral vertical lines, where integration is performed along the y axis. The sums required for computation of the variances in equation (3), can now be computed via integral lines as follows:

$$u_i \equiv \sum_{(x,y) \in T_i} f(x,y) = \sum_{(x_1,x_2,y) \in T} (I_1(x_2, y) - I_1(x_1 - 1, y)), \quad (8)$$

-continued $$v_i \equiv \sum_{(x,y) \in T_i} f^2(x, y) = \sum_{(x_1,x_2,y) \in T} (I_2(x_2, y) - I_2(x_1 - 1, y))$$

where $I_1(-1,y) = I_2(-1,y) = 0$. Thus, the number of memory references is reduced from the number of pixels to the number of lines in the rasterized template.

For efficient implementation, equation (3) can be expressed in a more convenient form according to the following equation (9) using the definitions of equation (8):

$$S = \frac{v_0 - u_0^2/n_0}{v_0 - \left(\sum_{i=1}^{N-1} \frac{u_i^2}{n_i}\right) - \frac{1}{n_N}\left(u_0 - \sum_{i=1}^{N-1} u_i\right)^2}. \quad (9)$$

Thus, the algorithm does not require multiple sums of squared pixel values $v_i$ to compute the matching score. It is sufficient to compute only the sum of squared pixel values in the entire template $T_0$ and N sums of pixels in $T_0, T_1, \ldots, T_{n-1}$. Moreover, for a rotationally-symmetrical template (such as $T_0$ which is a circle), $v_0$ and $u_0$ remain constant for each rotation angle, and only $u_1, \ldots, u_{M-1}$ need recomputing. Excluding one region $T_N$ from computations gives additional advantage in computation speed, as we can denote as $T_N$ the most complex region, consisting of the largest number of lines. Line configurations change during template rotation, thus alternating the most complex region at each rotation angle.

As the skilled person will appreciate, rapid Statistical Template Matching, as described in EP-A-1 693 783 (reference 2, infra), requires $\mathrm{E}8k_1$ memory references independently on template size, where $k_i$ is a number of rectangles in the region $T_i$. Correlation-based template matching requires $N_t$ (the number of pixels) memory references, quadratically dependent on the template size. In the generalized STM of the present invention, the number of memory references is $4k_0 + 2k_1 + \ldots + 2k_{N-1}$, where $k_i$ is the number of lines in the template region $T_i$. The total number of lines is roughly proportional to the template height multiplied by the number of regions N; therefore, it depends linearly on template size. Thus, the computational efficiency of the method according to the present invention lies between that of the rapid template matching and correlation-based template matching methods.

Figure 5:
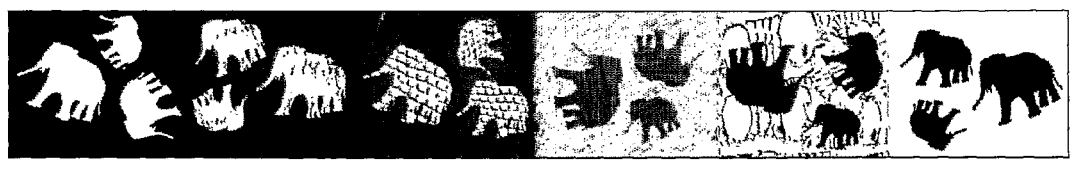
FIG. 5(a) illustrates a test image.
FIG. 5(b) illustrates a two region template.
FIG. 5(c) illustrates a matching score map, when the two region template of FIG. 5(b) is applied to the image of FIG. 5(a) in accordance with a method of an embodiment of the present invention.
Figure 5:
Figure 5:

FIG. 5 illustrates an example of image matching using the Generalised Statistical Template Matching (GSTM) technique of the present invention, as described above. FIG. 5(a) shows an image of interest, which includes a large number of different, geometrically transformed versions of an object, an elephant, as represented by the template shown in FIG. 5(b). The GSTM technique outputs a similarity map giving the best similarity score for all locations in the image. FIG. 5(c) illustrates such a similarity map for the image of FIG. 5(a) using the template of FIG. 5(b), with large values for the similarity score represented in white and small values in black. As can be seen in FIG. 5(c), peak values in the similarity map are identified, which correspond to locations of the object in the original image.

Adaptive Subpixel Statistical Template Matching

General Case

As mentioned above, an alternative embodiment of the present invention is not restricted by rotation and scale only, and uses full transformation P (FIG. 3) to iteratively estimate object location and transformation with high accuracy. In this embodiment the perspective model, which has eight transformation parameters p, is used for all simulations, but any other parametric transformation, is also applicable. The goal of this iterative STM method is to compute transformation parameters p adaptively from image data, maximizing the matching score $S(x,p)$ at a particular object location x. The discrete method of the first embodiment described above, can be used to find an initial approximation of the object location $x_0=(x_0, y_0)$ and initial transformation parameters $p_0$. Following the standard technique of iterative image registration (as described in reference 10, infra) it is possible to obtain a linear approximation of the transformed pixels $(x_0',y_0')$ near their initial location $(x_0,y_0)$. Such an approximation is given by:

$$f'(x_0', y_0') \approx f(x_0, y_0) + \frac{\partial f(x,y)}{\partial x}\Delta x' + \frac{\partial f(x,y)}{\partial x}\Delta y' \quad (10)$$

$$= f(x_0, y_0) + \frac{\partial f(x,y)}{\partial x}\sum \frac{\partial x'}{\partial p_i}\Delta p_i +$$

$$\frac{\partial f(x,y)}{\partial y}\sum \frac{\partial y'}{\partial p_i}\Delta p_i \equiv f^T(x_0, y_0)\Delta p,$$

where $\Delta p = (1, \Delta p_1, \ldots \Delta p_k)^T$ is a vector of parameter amendments and $$f^T(x_0, y_0) = (f(x_0, y_0), f_{p_1}(x_0, y_0), \ldots, f_{p_k}(x_0, y_0)) \quad (11)$$

$$f_{p_j} = \frac{\partial f(x,y)}{\partial y}\frac{\partial x'}{\partial p_j} + \frac{\partial f(x,y)}{\partial y}\frac{\partial y'}{\partial p_j} \quad (12)$$

Equation (12) includes partial derivatives of the image function on coordinates. In this embodiment they are computed using discrete approximations as shown in Appendix 1. Equation (12) includes also partial derivatives of the transformed coordinates on parameters of transformation. They have an analytic representation provided that the transformation model is given. In this embodiment the perspective model is used and such derivatives are presented in Appendix 1.

From equation (8), the linearized expressions for $u_i^2$ and $v_i$ have the following matrix form:

$$v_i \approx \Delta p^T \left(\sum_{(x,y)\in T_i} f(x,y)f^T(x,y)\right)\Delta p \equiv \Delta p^T V_i \Delta p \quad (13)$$

$$\frac{u_i^2}{n_i} \approx \Delta p^T \frac{1}{n_i}\left(\sum_{(x,y)\in T_i} f(x,y)\right)\left(\sum_{(x,y)\in T_i} f(x,y)\right)^T \Delta p \equiv \Delta p^T U_i \Delta p \quad (14)$$

Substituting equations (13) and (14) to equation (9), the linearized matching score is obtained in the form of the Rayleigh quotient:

$$S = \frac{\Delta p^T A \Delta p}{\Delta p^T B \Delta p}, \quad (15)$$

where $A = V_0 - U_0$, $B = V_0 - U_1 - \ldots - U_k$. The matrices A and B are one-rank modifications of the same covariance matrix $V_0$. They are symmetric by definition and positive-definite, which follows from the fact that both numerator and denominator in quotient (15) are image variances.

Maximization of the Rayleigh quotient (15) is equivalent to solving a generalized eigenvalue problem:

$$A\Delta p = SB\Delta p, \quad (16)$$

Any state-of-the-art method from linear algebra can be used to find the largest eigenvalue S (which is also the maximized matching score) and corresponding eigenvector $\Delta p$ (the amendments to the image transformation parameters). Examples of such methods are power iterations and inverse iterations (see reference 8, infra, for a detailed review). When the eigenvector $\Delta p$ is found, any vector of the form $\alpha \Delta p$ is also a solution of equation (16). It is possible to select an optimal $\alpha$ that improves the convergence and prevents the solution from oscillations around the maximum. This Linesearch strategy has been found to provide a robust solution. A detailed review of this and other strategies can be found in reference 9, infra.

The original non-linear problem can be solved by iteratively applying the linearized solution. The iterations stop when the matching score, the centre of the image patch and/or parameter amendments do not change significantly. Below is the outline of the AS STM algorithm:

---

ASSTM

1. Starts at iteration n=0 from initial values $S_0$, $x_0$, $p_0$ obtained by GSTM method
2. Resample image patch centered at coordinates $x_n$ using current parameters $P_n$
3. Compute image derivatives from resampled image patch $f(x_n',y_n')$; compute partial derivatives of the transformation model P in (12) using current values of $\{p_i\}$.
4. Compute matrices $V_0$, $U_1,\ldots,U_k$, A, B and solve the optimization problem (15) by finding maximal eigenvalue $S_{max}$ and eigenvector $\Delta p_n$ of (16)
5. Use the Linesearch strategy to find $\alpha_n$ maximizing $S_{max}(p_n + \alpha_n \Delta p_n) \equiv S_{n+1}$
6. Update parameters: $p_{n+1} = p_n + \alpha_n \Delta p_n$ and a new object location $x_{n+1} = P(x_n, P_{n+1})$.
7. If $|\alpha_n \Delta p_n| < \epsilon_1$ and/or $|S_{n+1} - S_n| < \epsilon_2$ then stop; else go to step 2 for a next iteration n=n+1.

---

Steps 2, 3 of this algorithm perform image processing, and are presented in Appendix 1 in detail. Other steps perform only numerical operations based on prior art linear algebra methods.

As the skilled person will recognize, the above algorithm provides just one example of implementing the ASSTM method, using the result of GSTM as an initial approximation of the geometric transformation in a gradient ascent method. Other examples are possible. In addition, where the similarity score is defined such that a best match is a minimum, a gradient descent method would be used.

Efficient Solution in Two-Region Case

If the template consists of two regions, $T_0 = T_1 U T_2$, there is an analytic solution of the eigenproblem (16) that does not require iterations. In this case the matrices A, B are $A = V_0 - U_0$, $B = V_0 - U_1 - U_2$. They are related by $A - B = aww^T$, derived from the definition of $U_i$ (14), where $a = n_1 n_2/n_3$ and $$w = \frac{1}{n_1}\sum_{(x,y)\in T_1} f(x,y) - \frac{1}{n_2}\sum_{(x,y)\in T_2} f(x,y) \quad (17)$$

The vector w is the linearized contrast between regions $T_1$ and $T_2$. The solution of (16) is given by the equations (18), (19)

$$\Delta p_{max} = B^{-1}w \quad (18)$$

$$S_{max} = aw^T \Delta p_{max} + 1 \quad (19)$$

For completeness of the description, proof of the equations (18), (19) is presented in the Appendix 2. Using theses results, step 4 of the ASSTM algorithm is implemented as follows:

---

4.1) Compute matrices $V_0$, $U_1$, $U_2$, B and vector w;
4.2) Solve the system $B\Delta p_n = w$ by the efficient Cholecky decomposition method as follows:
4.2.1) Apply Cholecky decomposition $B = LL^T$, where L is a bottom-triangular matrix
4.2.2) Solve a simplified linear system $Lz = w$, to find an intermediate vector z
4.2.3) Solve a simplified linear system $L^T \Delta p_n = z$, to find a required vector $\Delta p_n$

---

Figure 6:
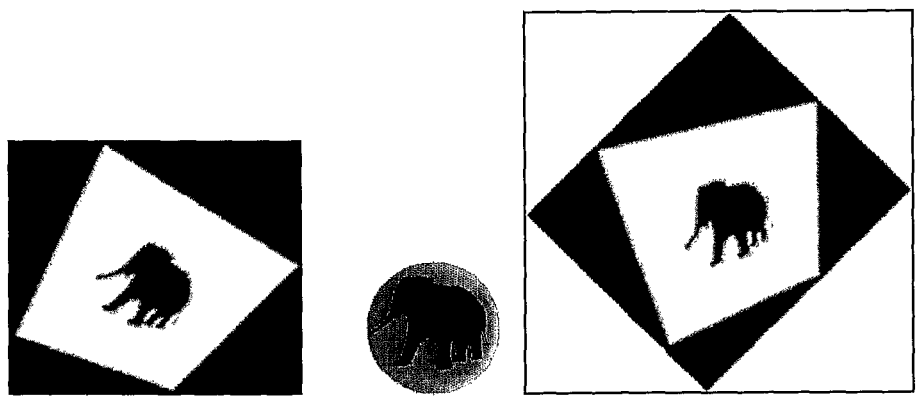
FIG. 6(a) illustrates a test image that has undergone perspective trans-formation.
FIG. 6(b) illustrates a two region template.
FIG. 6(c) illustrates the deregulation of the test image of FIG. 6(a) in accordance with a method of an embodiment of the present invention.
FIG. 6(d) illustrates iterations of image patch transformations, in accordance with a method of an embodiment of the present invention.
Figure 6:
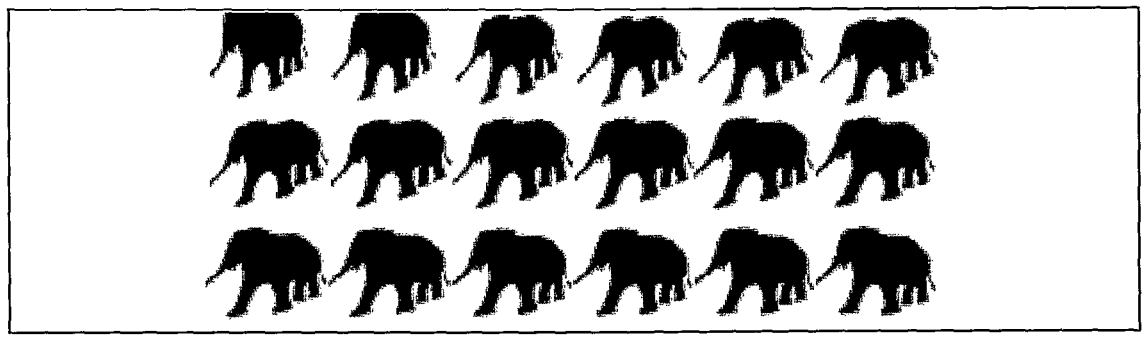

FIG. 6 illustrates an example of using the Adaptive Subpixel Statistical Template Matching (ASSTM) technique of the present invention, as described above, on synthetic image data. FIG. 6(a) shows an image of interest, which includes a single, geometrically transformed version of an object, an elephant, as represented by the template shown in FIG. 6(b). The GSTM technique outputs an initial approximation of the geometric transformation, corresponding to the geometrically transformed template that produces the best similarity score for the image. The Adaptive Subpixel Statistical Template Matching (ASSTM) technique is then applied to the initial approximation of FIG. 6(c), and iterations of the geometric transformation of the object are derived. FIG. 6(d) shows image patches derived using these iterations of the geometric transformation, in which the image of FIG. 6(c) is transformed. It can be seen that the 18th iteration corresponds to the template of FIG. 6(b).

Alternative Applications

The proposed methods can also be used to generalize the rapid object detection framework of reference 1, infra to:
Non-Haar-like features,
Features of complex shape
Arbitrarily oriented features.

The method can be applied in any circumstance in which standard template matching methods are usually applied, using appropriate designs for the application-specific topological template.

Another application is video coding, in which the local motion vectors are extracted by block matching methods. These methods are variants of the correlation-based template matching framework with quadratic complexity on template size. Replacing the templates by their equivalent topological template and computing the matching score of equation 9 will result in linear complexity of the algorithm on template size, and therefore will enable faster and more accurate video coding.

Another application is registration of multimodal images. Examples of such data are images of the same scene taken by different sensors, e.g. Optical cameras and Synthetic Aperture Radars (SAR). In these cases the majority of corresponding pixels are often uncorrelated, and the standard template matching techniques fail. At the same time it is possible for the analyst to detect some high-level structures, consisting of multiple regions that are presented in both kinds of data. In remote sensing data these can be rivers, lakes, fields, roads and so on. By defining a topological template as a collection of regions presented in one image it will be possible to register by the proposed method the other image transformed by a geometric transformation with unknown parameters.

PRIOR ART REFERENCES

1. P. Viola, M. Jones, Rapid object detection using a boosted cascade of simple features. IEEE CVPR, pp. 511-518, 2001
2. Sibiryakov, M. Bober, Fast method of object detection by statistical template matching, European Patent Application No 05250973.4
3. Jain, Y. Zhong, S. Lakshmanan, Object Matching Using Deformable Templates, IEEE TPAMI, Vol. 18(3), pp 267-278, 1996
4. S. Yoshimura, T. Kanade, Fast template matching based on the normalized correlation by using multiresolution eigen-images, IEEE/RSJ/GI Int. Conf. on Intelligent Robots and Systems (IROS '94), Vol. 3, pp. 2086-2093, 1994.
5. M. Jones, P. Viola, Fast Multi-view Face Detection, IEEE CVPR, June 2003
6. R. Lienhart, J. Maydt. An extended set of Haar-like features for rapid object detection, ICIP'02, pp. 900-903, V.1, 2002.
7. Messom, C. H. and Barczak, A. L., Fast and Efficient Rotated Haar-like Features using Rotated Integral Images, Australasian Conf. on Robotics and Automation, 2006
8. Golub, C. Van Loan, Matrix computations, Johns Hopkins University Press, Baltimore, Md., 1996. ISBN: 0-8018-5414-8
9. N. Gould, S. Leyffer, An introduction to algorithms for nonlinear optimization. In J. F. Blowey, A. W. Craig, and T. Shardlow, Frontiers in Numerical Analysis, pp. 109-197. Springer Verlag, Berlin, 2003.
10. Lucas, T. Kanade, An iterative image registration technique with an application to stereo vision. Proc. of Imaging understanding workshop, pp 121-130, 1981
11. Zitova, J. Flusser: Image Registration Methods: a Survey, Image and Vision Computing, vol. 24, pp. 977-1000, 2003

As the skilled person will appreciate, many variations and modifications can be made to the described embodiments. For example, the present invention can be implemented in embodiments combining implementations of other existing and related techniques, such as those taught in the above identified references. Such combinations of existing and related technologies will be readily apparent to the skilled person and it is intended to include all such combinations, and all such modifications and equivalents to the described embodiments that fall within the scope of the present invention.

Appendix 1. Image Processing Steps in ASSTM Algorithm

The image processing steps 2 and 3 in the ASSTM algorithm are demonstrated using the perspective transformation model given by equation (20). See also schematic representation in FIG. 3.

$$x' = \frac{p_1 x + p_2 y + p_3}{p_7 x + p_8 y + 1}; \; y' = \frac{p_4 x + p_5 y + p_6}{p_7 x + p_8 y + 1} \quad (20)$$

Some other transformation models are also represented by equation (20), e.g. in the affine model $p_7 = p_8 = 0$, in the similarity model (only rotation and scale), $p_1 = p_5$, $p_2 = -p_4$, $p_7 = p_8 = 0$. Therefore, such models are implicitly handled by the described embodiment.

In step 2, the image patch centred at current position is transformed using (20). This is a forward transformation and it is less suitable for computing the transformed image, because integer coordinates are mapped to floating-point coordinates. Pixel values f(x',y') at integer coordinates (x',y') are found by using inverted transformation equation (20) and by interpolating known pixels f(x,y) at integer coordinates (x,y). This is a well-known inverse mapping method. After obtaining the image f(x',y') at regular grid of integer coordinates (x',y'), the image derivatives, included in equation (12) are obtained by their discrete approximations as equation (21)

$$\frac{\partial f(x, y)}{\partial x} \approx \frac{f(x+1, y) - f(x-1, y)}{2}, \quad (21)$$

$$\frac{\partial f(x, y)}{\partial y} \approx \frac{f(x, y+1) - f(x, y+1)}{2}$$

where coordinates (x', y') are replaced by (x,y) for simplicity.

The other set of partial derivatives in equation (12) is computed differentiating equation (20), for example:

$$\frac{\partial x'}{\partial p_1} = \frac{x}{a}, \frac{\partial x'}{\partial p_2} = \frac{y}{a}, \frac{\partial x'}{\partial p_3} = \frac{1}{a}, \ldots,$$

where $a = p_7 x + p_8 y + 1$

Appendix 2. Solution of the Eigenproblem Eq. (16) for Two-Region Template

Statement: The largest eigenvalue of the eigenproblem (16) and the corresponding eigenvector are: $\Delta p_{max} = B^{-1}w$; $S_{max} = aw^T \Delta p_{max} + 1$ Proof: Consider an equivalent eigenvalue problem $(A-B)x = aww^T x = \lambda Bx$, having the same eigenvectors as equation (16) and eigenvalues $\lambda$ transformed as $\lambda = S-1$. Using Cholecky decomposition $B = LL^T$, where L is a bottom-triangular matrix, and introducing a vector transformation $y = L^T x$, we obtain another equivalent eigenvalue problem $w_1 w_1^T y = \lambda y$, where $w_1 = L^{-1} w$. One-rank matrix $w_1 w_1^T$ whose size is $(k+1) \times (k+1)$ has k-dimensional eigenspace corresponding to $\lambda_1 = 0$. The vectors $y_1, \ldots, y_k$ from this eigenspace satisfy $w_1^T y_i = 0$. The remaining eigenvector $y_{k+1}$ corresponding to $\lambda_2 \neq 0$ can be found from the orthogonality condition $y_{k+1}^T y_i = 0$. Therefore, $y_{k+1} = W_1$, from which the required eigenvector $\Delta p_{max}$ is $x_{k+1} = B^{-1} w$. Substituting $x_{k+1}$ into the eigenvalue equation, we obtain $aww^T B^{-1} w = \lambda_2 BB^{-1} w$, from which $\lambda_2 = aw^T B^{-1} w$. B is positive-definite; therefore, $\lambda_2 > 0$ and the largest eigenvalue of the problem (16) is $S_{max} = \lambda_2 + 1 = aw^T \Delta p_{max} + 1$.

The invention claimed is:

1. A method for detecting an object in an image by processing signals corresponding to the image, the method comprising:
   utilizing a processor to:
   process a template of the object to derive a representation of the template comprising a plurality of line segments distributed among a plurality of regions of the object, the plurality of line segments being defined in a vertical or horizontal direction,
   remove at least one of the object regions from the representation of the template to obtain a less complex representation of the template,
   compare the less complex representation of the template with regions of an image, and
   determine a similarity measure (S(x)) based on the comparisons between the less complex representation of the template and the image regions, wherein the similarity measure is determined using a statistical measure based on sums of pixel values and sums of squared pixel values of line segments of the image corresponding to each of the line segments of the less complex representation of the template.

2. A method as claimed in claim 1, wherein said less complex representation of the template for the object is derived by removing the object region having the largest number of line segments in either a horizontal or vertical direction.

3. A method as claimed in claim 1, wherein the representation of the template comprising a plurality of line segments $s_{ij}$ is derived by rasterising the template for the object with regions ($T_i$), where:

$$T_i = s_{i,1} \cup s_{i,2} \cup s_{1,3} \cup \ldots$$

is the representation of a region ($T_i$) by line segments (sij).

4. A method as claimed in claim 1, wherein a one dimensional integral lines representation of the image is used to compute the sums of pixel values and the sums of squared pixel values in the line segments of the image f(x,y) corresponding to line segments of the template:

$$I_1(x, y) = \sum_{a \leq x} f(a, y); I_2(x, y) = \sum_{a \leq x} f^2(a, y)$$

for a template having horizontal line segments, or $$I_1(x, y) = \sum_{a \leq y} f(x, a); I_2(x, y) = \sum_{a \leq y} f^2(x, a)$$

for a template having vertical line segments,
where a is a variable coordinate of the image pixels.

5. A method as claimed in claim 4, further comprising computing sums of pixel values and sums of squared pixel values using the equations:

$$u_i \equiv \sum_{(x,y) \in T_i} f(x, y) = \sum_{(x_1, x_2, y) \in T_i} (I_1(x_2, y) - I_1(x_1 - 1, y)),$$

$$v_i \equiv \sum_{(x,y) \in T_i} f^2(x, y) = \sum_{(x_1, x_2, y) \in T_i} (I_2(x_2, y) - I_2(x_1 - 1, y))$$

where:
$u_i$ = sum of pixel values in a region
$v_i$ = sum of squared pixel values in a region
$T_i$ is an i-th region of the template
$(x_1, x_2 y)$ is a horizontal line segment consisting of pixels (x,y), $x_1 \leq x \leq x_2$, or using equivalent equations for vertical line segments.

6. A method as claimed in claim 1, wherein prior to the similarity measure being determined, the method comprises:
   determining whether the template is substantially circular, and
      if the template is substantially circular, determine the similarity measure based on the sums of pixel values of line segments of the image corresponding to each of the line segments of the template, or
      otherwise, determine the similarity measure based on the sums of pixel values of line segments of the image corresponding to each of the line segments of the template and the sum of squared pixel values of the image corresponding to the template.

7. A method as claimed in claim 1, wherein the similarity measure is determined using the sum of squared pixel values of the image corresponding to the template ($v_0$) and the sums of pixel values of the image corresponding to a plurality of template regions ($u_i$), given by the equation:

$$S = \frac{v_0 - u_0^2/n_0}{v_0 - \left(\sum_{i=1}^{N-1} \frac{u_i^2}{n_i}\right) - \frac{1}{n_N}\left(u_0 - \sum_{i=1}^{N-1} u_i\right)^2}$$

where $n_i$ is the number of pixels in i-th region.

8. A method as claimed in claim 1, further comprising deriving a geometrically transformed version of the template and rasterising the geometrically transformed template to derive a geometrically transformed template comprising a plurality of line segments.

9. A method as claimed in claim 8, further comprising:
comparing the geometrically transformed template comprising a plurality of line segments with regions of the image, and
determining a second similarity measure (S(x)), wherein the second similarity measure is determined using a statistical measure based on the sums of pixel values and sums of squared pixel values of line segments of the image corresponding to each of the line segments of the geometrically transformed template.

10. A method as claimed in claim 8 comprising deriving a plurality of geometrically transformed versions of the template using a plurality of predeteimined geometric transformations.

11. A method as claimed in claim 10, wherein said plurality of geometrically transformed templates use transformations that are a function of two parameters, preferably rotation and scale.

12. A method as claimed in claim 11, wherein said plurality of geometrically transformed templates are derived by applying a set of predetermined similarity transforms to the template.

13. A method as claimed in claim 10, further comprising:
comparing each of the geometrically transformed templates comprising a plurality of line segments with regions of the image;
determining the similarity measure for each of the plurality of geometrically transformed versions of the template, and
deriving one or more geometrically transformed versions of the template having a peak value for the similarity measure for at least one region of the image.

14. A method as claimed in claim 13, wherein each of the one or more derived geometrically transformed versions of the template having a peak value for the similarity measure is used as an approximation of a transformation of the object in the image.

15. A method as claimed in claim 14, comprising:
deriving an optimal approximation of the transformation of the object in the image using a gradient ascent method where the peak value is a maximum, or a gradient descent method where the peak value is a minimum.

16. A method as claimed in claim 15, wherein the transformation of the object in the image is a function of two or more parameters and is preferably the eight-parameter perspective transformation.

17. A method as claimed in claim 14, further comprising iterating, based on the image, the transformation of the or each derived geometrically transformed template having a peak value to derive a transformation with an optimized peak similarity measure.

18. A method as claimed in claim 17, wherein the step of iterating involves iterations of vectors in a multidimensional parameter space.

19. A method as claimed in claim 1, wherein the template is a topological template comprising a union of regions.

20. A method for detecting an object in an image by processing signals corresponding to the image, the method comprising:
utilizing a processor to:
process a template of the object to derive a representation of the template comprising a plurality of line segments distributed among a plurality of regions of the object, the plurality of line segments being defined in a vertical or horizontal direction,
remove at least one of the object regions from the representation of the template to obtain a less complex representation of the template,
compare the less complex representation of the template with regions of an image, and
determine a similarity measure (S(x)) based on the comparisons between the less complex representation of the template and the regions of the image, wherein the similarity measure is determined using a statistical measure that is a function of integral lines defined by:

$$I_1(x, y) = \sum_{a \le x} f(a, y); I_2(x, y) = \sum_{a \le x} f^2(a, y)$$

where:
$I_1$ is an integral line representation via sum of pixel values;
$I_2$ is an integral line representation via sum of squared pixel values;
f(x,y) is the image; and
a is a variable coordinate of the image pixels for a line segment.

21. A method for detecting a geometrically transformed object in an image by processing signals corresponding to the image, the method comprising:
utilizing a processor to:
geometrically transform a template of the object
derive a representation of the geometrically transformed template comprising a plurality of line segments distributed among a plurality of regions of the object, the plurality of line segments being defined in a vertical or horizontal direction,
remove at least one of the object regions from the representation of the geometrically transformed template to obtain a less complex representation of the geometrically transformed template,
compare the less complex representation of the geometrically transformed template with regions of the image, and
determine a similarity measure (S(x)) based on the comparisons between the less complex representation of the geometrically transformed template and the regions of the image, wherein the similarity measure is determined using a statistical measure based the sums of pixel values and sums of squared pixel values of line segments of the image corresponding to each of the line segments of the less complex representation of the geometrically transformed template.

22. A method for detecting a geometrically transformed object in an image by processing signals corresponding to the image, the method comprising:
utilizing a processor to:
geometrically transform a template of the object derive a representation of the geometrically transformed template comprising a plurality of line segments distributed among a plurality of regions of the object, the plurality of line segments being defined in a vertical or horizontal direction, remove at least one of the object regions from the representation of the geometrically transformed template to obtain a less complex representation of the geometrically transformed template, and comparing the less complex representation of the geometrically transformed template with regions of the image, and determine a similarity measure (S(x)) based on the comparisons between the less complex representation of the geometrically transformed template and the regions of the image, wherein the similarity measure is determined using a statistical measure that is a function of integral lines defined by:

$$I_1(x, y) = \sum_{a \leq x} f(a, y); I_2(x, y) = \sum_{a \leq x} f^2(a, y)$$

where:
$I_1$ is an integral line representation via sum of pixel values;
$I_2$ is an integral line representation via sum of squared pixel values;
f(x,y) is the image; and
a is a variable coordinate of the image pixel values for a line segment, and detecting the geometrically transformed object on the basis of S(x).

23. Apparatus comprising the processor and a memory for carrying out the method of claim 1.

24. A non-transitory computer readable medium including instructions that, when executed, perform the method of claim 1.

* * * * *